G. GRIFFITH.
PRISMATIC TELESCOPE.
APPLICATION FILED JUNE 6, 1911.
1,016,562.
Patented Feb. 6, 1912.
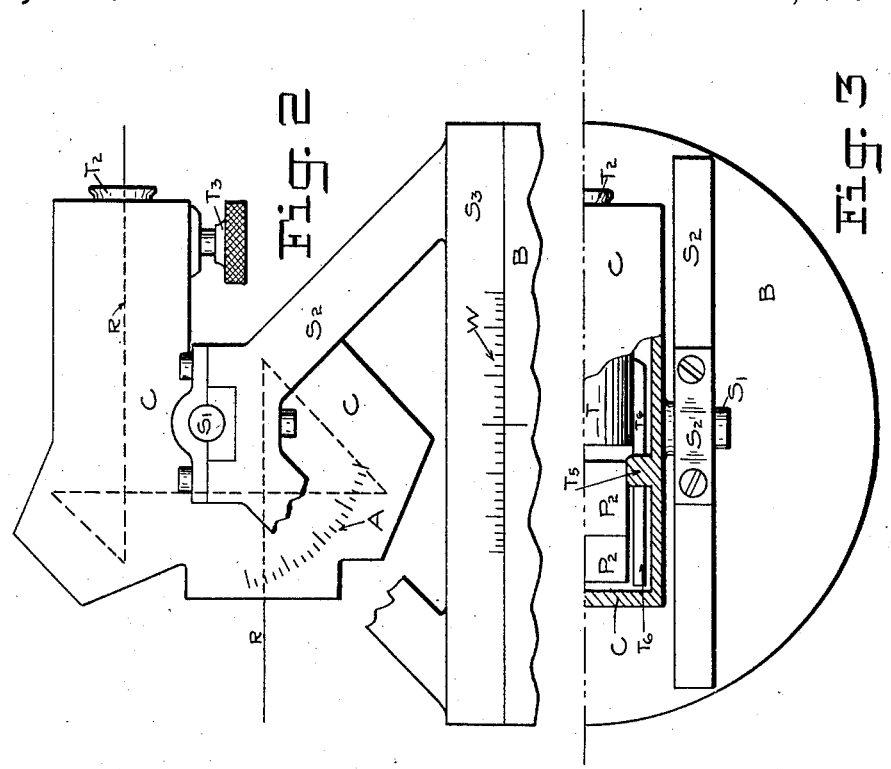
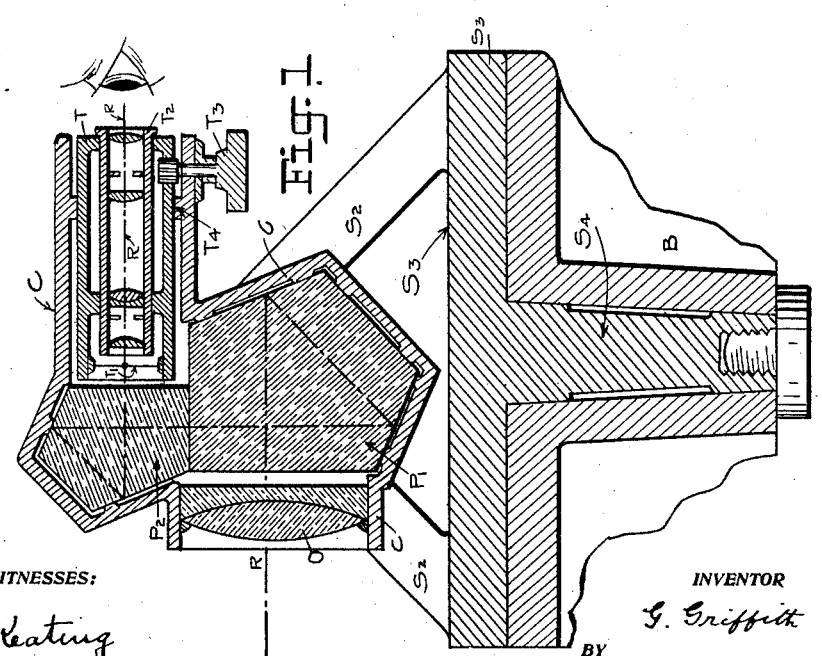
WITNESSES:
INVENTOR
ATTORNEY

UNITED STATES PATENT OFFICE.

GRAVES GRIFFITH, OF SAN FRANCISCO, CALIFORNIA.

PRISMATIC TELESCOPE.

1,016,562. Specification of Letters Patent. Patented Feb. 6, 1912.

Application filed June 6, 1911. Serial No. 631,560.

*To all whom it may concern:*

Be it known that I, GRAVES GRIFFITH, a citizen of the United States, residing at San Francisco, in the county of San Francisco and State of California, have invented new and useful Improvements in Prismatic Telescopes, of which the following is a specification.

The purpose of this invention is to provide a new and improved type of prismatic telescope, wherein the usual cumbersome telescope tube is dispensed with and, by means of suitably arranged prisms of the pentagonal, or optical square, form, there is secured a much more compact and easily handled intrument and one affording greatly increased power and accuracy, owing to the greater stability of its parts and increased proportional length of focus of its objective.

While the instrument is devised more particularly for surveying gun-sight instruments, it is not the purpose to restrict its use to this class of instruments, it being evident that this arrangement of optical elements is equally applicable to prismatic binoculars, as well as other types of optical instruments. The method of arrangement of optical elements whereby this greatly increased power is secured in an instrument of much more stable form and reduced compass can be readily understood by reference to the accompanying drawings, in which—

Figure 1 is a longitudinal section; Fig. 2 is a side elevation; Fig. 3 is a half plan.

The optical arrangement, as is shown, consists of an objective O, two prisms $P_1$, $P_2$ of the pentagonal, or optical square, form, the second of which, as regards the first, is positioned in an invert-reverse order, a telescopic tube T slidable in bearings $T_4$, $T_5$ and carrying a slide $T_6$, slidable in the bearing $T_5$, a cross-wire $T_1$ or substitute therefor, and an ocular $T_2$. These elements are inclosed in a shell C, turning about a horizontal axis in a vertical plane, for the measurement of altitude, and provided with an altitude scale A, for which purpose it has trunnions S, rotating in bearings in standards $S_2$ on a plate $S_3$, the whole being mounted to turn about a vertical axis and in a horizontal plane on a spindle $S_4$ in a bearing in a base B having a scale W for measurement of angles in this plane. The broken line R—R, in Fig. 1 indicates the course and reflections of a ray of light on its way from an object to the eye of an observer, and from said figure it may be seen that, by my improved construction, an extremely long focus for the objective may be confined in a comparatively small space.

As will be noted, the means for focusing for the objective O also carries the cross-wire $T_1$ and the eyepiece $T_2$. The focusing for the objective is accomplished through the agency of a rack and pinion operated by a handle $T_3$, while that for the eyepiece $T_2$ is accomplished by moving the tube $T_2$, with its lenses, in a direction parallel with its optical axis. This manner of combining the arrangements for focusing for the objective and the eyepiece in a simple compact form is peculiarly a feature of this instrument.

As illustrated in Fig. 1, the aperture of the objective is one and one-fourth inches, its focus eight inches. A telescope of the common form of equal power would necessitate a telescoping tube of from fourteen to sixteen inches in length. Thus a great gain in compactness is obtained.

I claim:—

1. In a prismatic telescope, an objective adapted to receive rays of light from a distant point and to cause convergence thereof, a magnifying eye-piece for said rays, and between said objective and eye-piece two prisms of optical square form rigidly secured in relation to one another in an invert-reverse order.

2. In a prismatic telescope, an objective, two prisms of pentagonal, or optical square, form, the second prism of which, with regard to the first, is positioned in an invert-reverse order, a tube, a cross-wire supported thereby, means for moving this tube with regard to the objective, a tube movable within the aforesaid tube, and a shell for said elements, all for the purpose described and as set forth.

3. In a prismatic telescope, an objective, two prisms of the pentagonal, or optical square, form, the second prism of which is positioned with regard to the first in an invert-reverse order, a tube, a cross-wire supported thereby, a tube within the first-named tube, ocular lenses carried by the second tube, means for moving the first mentioned tube with reference to the objective, the second-mentioned tube being movable with reference to the cross-wire, a shell provided with trunnions, a graduated casing or support for said shell, for the purpose and substantially as set forth.

4. In a prismatic telescope, an objective, two prisms of the pentagonal or optical square form, the second prism of which is positioned in an invert-reverse order with reference to the first, a tube, a cross-wire, carried thereby, a tube within the first-named tube, ocular lenses carried by said second-named tube, means for moving the first-mentioned tube with reference to the objective, the second-mentioned tube being movable with reference to the cross-wire, a shell carrying the before-mentioned optical elements and having trunnions and a graduated arc, and a mounting for said shell, said mounting also carrying a graduated arc, all for the purpose as described and in the manner as set forth.

In testimony whereof I have hereunto set my hand in the presence of two subscribing witnesses.

GRAVES GRIFFITH.

Witnesses:
F. M. WRIGHT,
D. B. RICHARDS.

Copies of this patent may be obtained for five cents each, by addressing the "Commissioner of Patents, Washington, D. C."